United States Patent

Chen et al.

[11] Patent Number: 6,089,741
[45] Date of Patent: Jul. 18, 2000

[54] APPARATUS AND METHOD FOR COUPLING HIGH INTENSITY LIGHT INTO LOW TEMPERATURE OPTICAL FIBER

[75] Inventors: Chingfa Chen, West Covina; Kenneth K. Li, Arcadia; Douglas M. Brenner, Los Angeles, all of Calif.

[73] Assignee: Cogent Light Technologies, Inc., Clarita, Calif.

[21] Appl. No.: 09/025,297

[22] Filed: Feb. 18, 1998

Related U.S. Application Data

[63] Continuation-in-part of application No. 08/699,230, Aug. 19, 1996, Pat. No. 5,761,356.

[51] Int. Cl.[7] ..................................................... G02B 6/00
[52] U.S. Cl. ........................ 362/583; 362/551; 362/554; 362/556; 362/580; 362/558; 385/27; 385/28; 385/29; 359/350
[58] Field of Search ..................................... 385/901, 902, 385/27–29; 313/372; 362/551, 554, 556, 558, 583, 572, 574, 580, 317, 33; 359/356, 890, 350

[56] References Cited

U.S. PATENT DOCUMENTS

| | | | |
|---|---|---|---|
| 3,641,332 | 2/1972 | Reick et al. | 240/1 |
| 4,988,622 | 1/1991 | Martinez . | |
| 5,099,399 | 3/1992 | Miller et al. | 362/32 |
| 5,309,330 | 5/1994 | Pillers et al. | 362/32 |
| 5,396,571 | 3/1995 | Saadatmanesh et al. | 385/33 |
| 5,446,818 | 8/1995 | Baker et al. . | |
| 5,452,392 | 9/1995 | Baker et al. . | |

*Primary Examiner*—Sandra O'Shea
*Assistant Examiner*—Ismael Negron
*Attorney, Agent, or Firm*—Rothwell, Figg, Ernst & Manbeck

[57] ABSTRACT

A method and apparatus for coupling high intensity light into a low melting temperature optical fiber which uses a high temperature, low NA optical fiber as a spatial filter between a source of high intensity light and a low melting temperature, low NA optical fiber. In an alternate embodiment, the spatial filter is composed of a fused bundle of optical fibers. The source of light may be a high intensity arc lamp or may be a high NA, high melting temperature optical fiber transmitting light from a remote light source.

14 Claims, 6 Drawing Sheets

INPUT PROFILE NA=0.68 FUSED BUNDLE NA=0.57 OUTPUT PROFILE AT FUSED BUNDLE SURFACE

APPARATUS AND METHOD FOR COUPLING HIGH INTENSITY LIGHT INTO LOW TEMPERATURE OPTICAL FIBER

CROSS-REFERENCE TO RELATED APPLICATION

This application is a continuation-in-part of application Ser. No. 08/699,230, filed Aug. 19, 1996, now U.S. Pat. No. 5,761,356.

BACKGROUND OF THE INVENTION

1. Field of the Invention

This invention relates generally to high intensity illumination systems and more particularly relates to optical transmission systems using fiber optic light guides to carry light from high intensity, high temperature light sources. More specifically, this invention relates to apparatus and methods for coupling light from a high intensity light source into low temperature optical fibers.

2. Description of the Related Art

In the field of fiber optic transmission systems, it is known to use high intensity, high thermal output light sources such as, for example, mercury arc, metal halide arc, or xenon arc lamps, which have typical operating power in the range of 35 to 1000 watts. See U.S. Pat. No. 4,757,431, issued Jul. 12, 1988 and assigned to the same assignee herein. These light sources are used with a fiber optic light guide that may consist of a single fiber or a bundle of many small fibers. Standard fiber bundles typically consist of low melting temperature glass in contrast to fused silica or quartz for which the melting temperature is approximately 1000° C. higher. Such systems have particular use in medical and industrial applications and are used in conjunction with instruments such as endoscopes, borescopes and the like.

Coupling light from a high intensity light source into a light guide requires the condensing and focusing of light, and its concentration results in a high power density at the focal point. The temperature rise at the focal point depends on the extent to which the light is absorbed. Larger spot sizes are associated with lower temperature rise; a small degree of absorption will result in a large increase in temperature. To reduce the temperature rise, the power density must be reduced as associated with larger spot sizes. To prevent a fiber bundle from melting, IR filters are typically placed between the light source and the bundle. As the focal point decreases in size, higher melting temperature materials such as quartz become necessary. As noted in U.S. Pat. No. 4,757,431, efficient methods exist for focusing the light down to a diameter of 1 mm or smaller and result in a much higher power density at the optical fiber target than is found with illumination systems delivering light through a fiber bundle. Such high power densities require light guides consisting of higher melting temperature materials to prevent melting of the optical fiber at the point of coupling of the light into the fiber. This applies to either single fiber light guides or small diameter (2 mm or smaller) fiber bundles.

Optical fibers made of quartz are expensive, and it is necessary that such optical fibers be used over a sufficiently long time period to justify their cost. In a surgical environment, this means that such optical fibers be sterilized after each use. Since sterilization techniques typically involve the use of high temperature autoclaves or chemical disinfectants, the optical fiber optic light guides must be made to withstand thermal damage and damage from the use of such chemicals. Additionally, quartz fibers are relatively brittle and difficult to bend without breaking, requiring a high degree of care during handling.

Although standard glass (e.g. borosilicate) fiber bundles are made of relatively inexpensive materials, their performance in transmission over long fiber lengths is limited by the transmissivity of the materials and packing losses. In addition, the low melting temperature of the glass places limitations on the smallest size bundle that can be coupled to a high intensity light source.

Coupling a fiber optic device, such as a microendoscope having an illumination aperture of 2 mm or less, to a typical light-delivering fiber bundle 3 to 5 mm in diameter is inefficient and results in poor light transmission to the optical device. The inefficiency arises from the mismatch in area. Reducing the size of the fiber bundle to match that of the device causes substantial coupling losses from the source, while narrowing the focus to a small diameter bundle results in melting of the bundle.

In general, the size of the light guide coupled to a fiber optic device should be matched to the diameter of the device. Hence for small diameter fiber optic devices (e.g. less than 2 mm) a single high temperature fiber or high temperature fiber bundle is necessary. Single fiber light guides having a diameter of 1 mm or less coupled to a source of light are more efficient than a bundle of similar size since bundles have inherent packing losses. Because single quartz or glass fibers over 1 mm diameter are generally too stiff for practical use, fiber bundles are typically used for applications requiring diameters greater than 1 mm.

Whereas single quartz fibers and glass fiber bundles are useful and effective in transmitting light, they are not the least expensive way of transmitting light. Plastic optical fibers are both inexpensive and highly flexible, even at diameters greater than 1 mm. Accordingly, it would be desirable to use these low cost plastic fibers in conjunction with high intensity light sources. Like glass bundles, however, plastic has a much lower melting temperature than quartz. Therefore, use of a single plastic fiber to deliver sufficient illumination requires an intermediate light delivery system between the plastic fiber and the light source.

One example of an application in which low cost plastic fibers or small diameter, lower cost glass fiber bundles would be useful is the medical field. Use of low cost fibers would enable light guides for lighted instruments in medicine to be sold as a single use, sterile product eliminating the need for sterilization after each use. The use of small bundles coupled to a single, high intensity quartz fiber would enable smaller devices to be manufactured. However, neither plastic fibers nor small diameter glass fiber bundles can withstand the high temperature generated at the focal point of a light source which is condensed and focused into a small spot commensurate in size with the diameter of such light guides.

U.S. Pat. No. 4,986,622 issued Jan. 22, 1991, discloses one prior art attempt at solving the problem of avoiding thermal damage to low temperature plastic fibers. The '622 patent discloses a light transmission apparatus coupling a heat resistant glass fiber optic bundle at the output of a high intensity light source. The glass optical fiber bundle is then mechanically close-coupled to a plastic fiber optic bundle in a standard connector. The '622 patent requires a mechanical matching of the glass fiber bundle to the plastic fiber bundle in order to avoid the generation of a significant amount of heat at the coupling point, which would damage the plastic fiber bundle.

The '622 patent requires that the diameter of the glass bundle be less than or equal to the diameter of the plastic bundle. This is to allow the cone of light emanating from the glass bundle to be transmitted into the plastic bundle without light loss. In practice, however, this is efficient only if there is also an optical specification with respect to the cone-angle of light (i.e., numerical aperture NA) for each bundle or optical fiber and the spacing between them. The '622 patent fails to recognize this requirement. Moreover, if the diameter of the glass bundle were significantly smaller than that of the plastic bundle, thermal damage to the plastic fiber would result at high power densities if a sufficient amount of light were coupled from the light source.

In the context of the '622 patent, it appears that typical 3 or 5 mm diameter bundles are used, since the connection between glass and plastic fiber bundles is that typically found in medical lighting equipment. Such connectors make use of a proximity coupling between fiber bundles with minimal spacing at the junction and rely upon a matching of the relative diameters of the bundles. For higher power densities, such connectors would cause damage to the low melting temperature fiber bundle.

Additionally, the '622 solution is insufficient to maximize light output from a low temperature fiber coupled to a high temperature single fiber delivering light from a high intensity source.

There remains a need in the art for improvement in methods and apparatus for coupling high intensity light into low melting temperature optical fibers.

SUMMARY OF THE INVENTION

The present invention provides a method and apparatus for coupling high intensity light into a low melting temperature optical fiber which uses a high temperature optical fiber of specified numerical aperture (NA) as a spatial filter between a source of high intensity light (at least 400 mW/mm$^2$) and a low melting temperature, low NA optical fiber. The spatial filter not only allows the low melting temperature optical fiber to be removed from the focus point of the high intensity light, but also dissipates unguided modes of light transmission before they enter the low temperature optical fiber. The spatial filter may be placed between the focus of a high intensity light source and a low melting temperature optical fiber, and alternatively may be placed between a high NA, high melting temperature optical fiber and a low temperature, low NA optical fiber. The source of high intensity light may be a direct source focused to a spot of less than 2 mm or alternatively may be from a second single fiber coupled to a high intensity light source. If the numerical aperture of the receiving fiber is less than that of the spatial filter a spaced apart configuration is required with a mechanical heat sink if the light intensity is higher than about 400 mW/mm$^2$. If the numerical apertures are equal or that of the receiving fiber is larger than that of the spatial filter, then the extent to which the fibers are spaced apart and the requirement for mechanical heat sinking is dependent upon the relative diameters of the fibers, the wavelength of light, and the power density.

According to a further preferred embodiment, the spatial filter is formed of a bundle of single fiber optics, fused together.

BRIEF DESCRIPTION OF THE DRAWINGS

The present invention will become more fully understood from the detailed description given hereinbelow and the accompanying drawings, which are given by way of illustration only and which are not limitative of the present invention, and wherein.

DETAILED DESCRIPTION OF THE PREFERRED EMBODIMENTS

Figure 3:
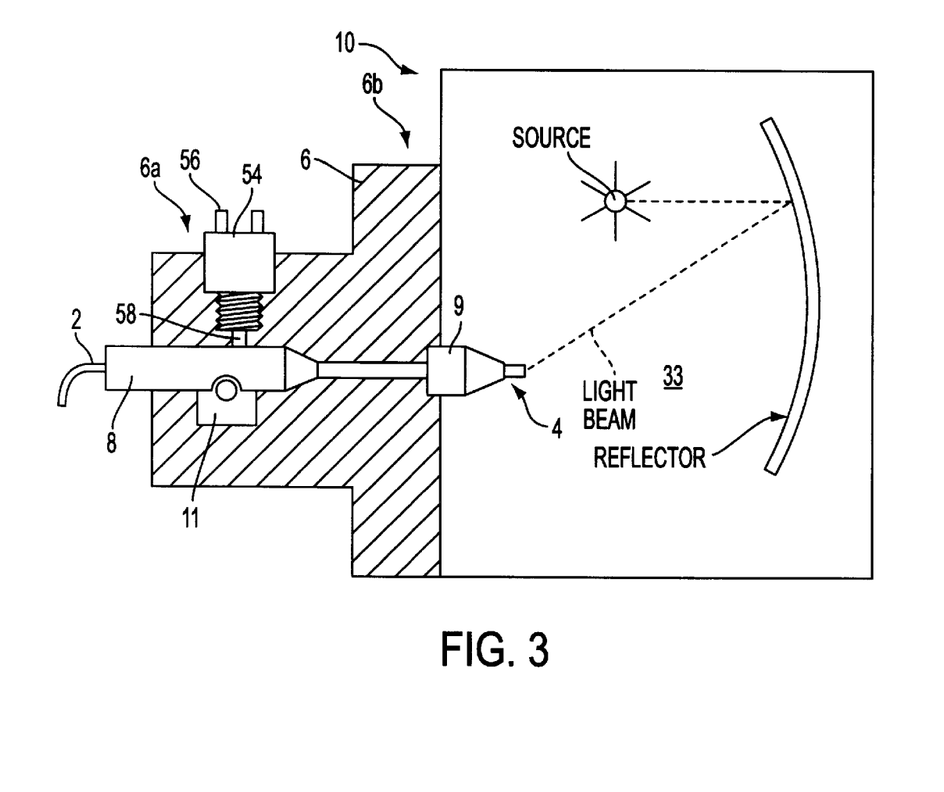
FIG. 3 is a diagram of a high intensity illumination system which can be used with the present invention.

An example of a spurce of high intensity light such as contemplated by the present invention is shown in FIG. 3. Light source housing 10 includes a light source (typically, a high intensity arc lamp such as xenon, metal halide or mercury arc lamp or any other visible electromagnetic radiation source capable of being focused to a power density of at least 400 mW/mm$^2$) and a concave reflector for collecting and condensing light from the source onto the input end 4 of an optical fiber 2. The operation of the collecting and condensing system is described in the aforementioned U.S. Pat. No. 4,757,431. A receiving block 6 made of high thermal conductivity metal (i.e., aluminum) is attached to one of the walls of housing 10 for securing a connector 8, containing optical fiber 2, inserted into end 6a of block 6, to the housing. The housing 10 also contains a bushing 9, which is secured to block 6 at end 6b.

Connector 8 is secured to block 6 through a locking mechanism 11. A push button switch 54 is disposed in the block 6 with a push button 58 being provided to keep the shutter of the light source closed in order to protect a user's eyes from the high intensity light in the absence of a connector 8 being present. Leads 56 connect to circuitry for operating the shutter when push button 58 is pushed in by the presence of the connector 8.

The nature of the light source system 33 is such that a very high light flux density is focussed onto the small area of the input end 4 of the fiber 2. The focussed light spot will include light of high divergence angles, which will cause a large number of propagation modes to enter the fiber. However, the number of modes which may be propagated or guided in the fiber is limited by the physical characteristics of the fiber, including such factors as the NA of the fiber and the radius of the fiber core.

Because of area and mode mismatching, only a fraction of the focused light is actually transmitted by the fiber. The remaining light is either absorbed in the area surrounding the input end of the fiber, causing the generation of a significant amount of heat, or enters the fiber in unguided modes, which the fiber is incapable of propagating.

Figure 1:
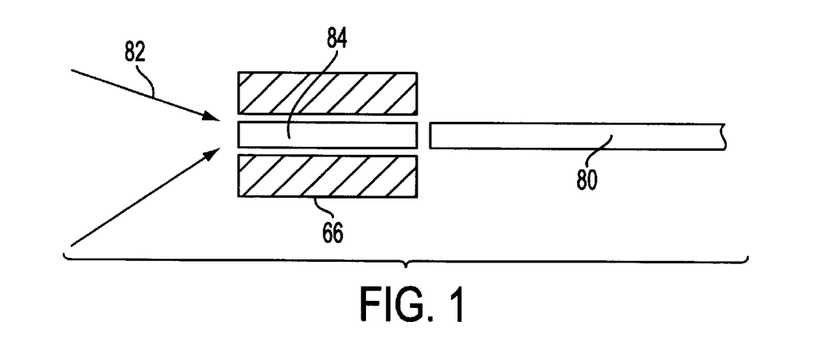
FIG. 1 is a diagram illustrating the general concept of the spatial filter according to the present invention.

FIG. 1 illustrates the general concept of the present invention. High intensity light 82 containing high divergence angle components is focused onto a short section of heat resistant optical fiber made of high melting temperature material. One example of such a high melting temperature fiber is a quartz fiber; however, any other suitable high melting temperature material may be used. The high temperature fiber 84 is surrounded by a heat sink 66, which is made of thermally conductive material, for example metal.

The high temperature fiber 84 is able to withstand the heat generated by that light which does not enter the fiber but which is incident on the area surrounding the input end of the fiber. Additionally, the section of fiber is long enough such that the fiber functions as a spatial filter, in which all unguided modes of light entering the input end of the fiber are fully dissipated within the length of the fiber 84. Consequently, the output of the fiber 84 will consist of guided modes of light only which will be coupled as guided modes of the low melting temperature optical fiber 80. Optical fiber 80 is made of materials such as plastic or soft glass such as borosilicate, for example. Since only guided modes are coupled into low temperature fiber 80, there is no generation of excess heat between the output end of fiber 84 and the input end of fiber 80. Ideally, the numerical aperture of the high temperature fiber should be equal to or less than the numerical aperture of the low melting temperature fiber. However, even if the numerical aperture of the high temperature fiber is higher, spatial filtering of the light from the source will eliminate high order modes that would be converted into heat.

Depending on the purity and melting temperature of the low temperature fiber, additional measures may be necessary to ensure no thermal damage. Plastic fibers often have impurities which will absorb light, causing thermal runaway. The effect is more noticeable when the numerical aperture of the high temperature fiber is greater than that of the low temperature fiber. For example, at high power densities light that is absorbed just inside the surface of a plastic receiving fiber may cause melting and cratering of the plastic fiber surface. This effect is more pronounced when the NA of the plastic fiber is lower than the NA of the high temperature fiber. This effect can be eliminated by spacing the fibers apart and providing a heat sink to carry away resulting thermal energy. The actual spacing depends on the power density and the NA.

For example, for a 0.47 mm diameter quartz fiber of NA=0.68 delivering 2 watts of visible light (410 nm to 650 nm) to a 1 mm diameter polymethacrylate fiber of NA=0.55, the required spacing is at least 1.7 mm to avoid thermal damage to the plastic fiber. At this spacing, some of the higher angle light exiting the high temperature fiber diverges from the aperture of the plastic fiber, thus providing an additional means of spatial filtering. With the same spacing and a 1.5 mm diameter plastic fiber, the total power transmitted would be twice that of the 1 mm fiber. In both cases, the amount of light transmitted to the plastic fiber without damage is considerably greater than what is possible by coupling directly to the light source. The spaced apart configuration decreases the intensity of light impinging on the surface of the fiber and decreases the probability of reaching threshold absorption within the fiber, which would cause thermal damage. The heat generated by the excess light requires the use of a heat sink.

The melting threshold of plastic fiber depends on the composition of the fiber and level of impurities. Materials that absorb the wavelengths of light transmitted from the spatial filter tend to lower the amount of light able to be coupled without damage. Similarly, if the NA of the spatial filter is greater than that of the receiving plastic fiber, the coupling efficiency is diminished and the damage threshold is thus lower for the same spacing as when the NA of the spatial filter is less than that of the receiving plastic fiber. By contrast, coupling high intensity light from a 0.68 NA quartz single fiber to a 1 mm borosilicate bundle of NA=0.86 or 0.55 requires no specific spacing (the only spacing requirement is that the single fiber be placed so that light just fills the aperture of the bundle) and can withstand 2 watts of transmitted light power for a number of hours. This result is primarily from the higher melting temperature of borosilicate as compared with plastic. Similar results would be expected with a single borosilicate fiber (1 mm diameter). Care must be taken to avoid contamination at the surface of the receiving fibers, as thermal degradation and runaway is highly likely due to absorption by the contaminant.

Figure 2A:
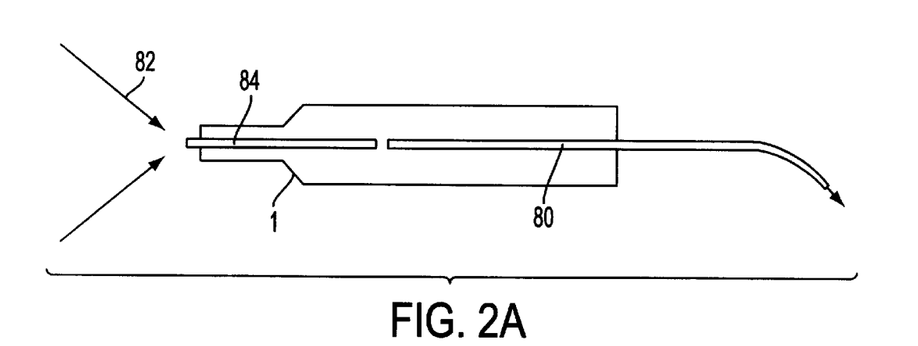
FIGS. 2a–2c illustrate respective alternate embodiments of the present invention as implemented with a proximal connector.
Figure 2B:
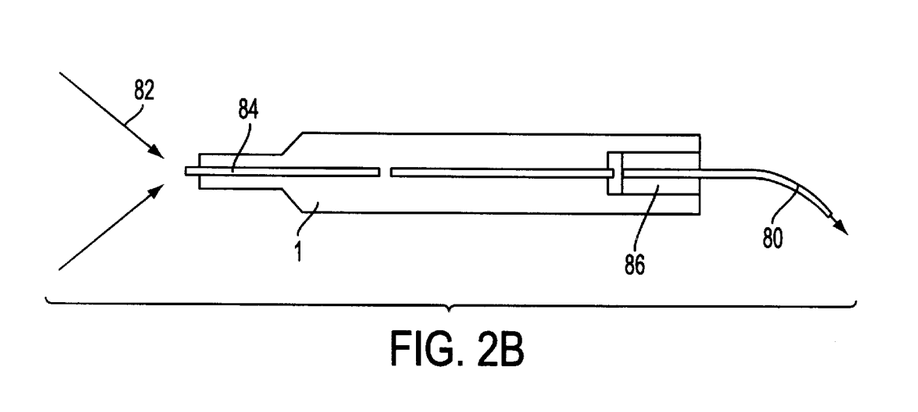
Figure 2C:
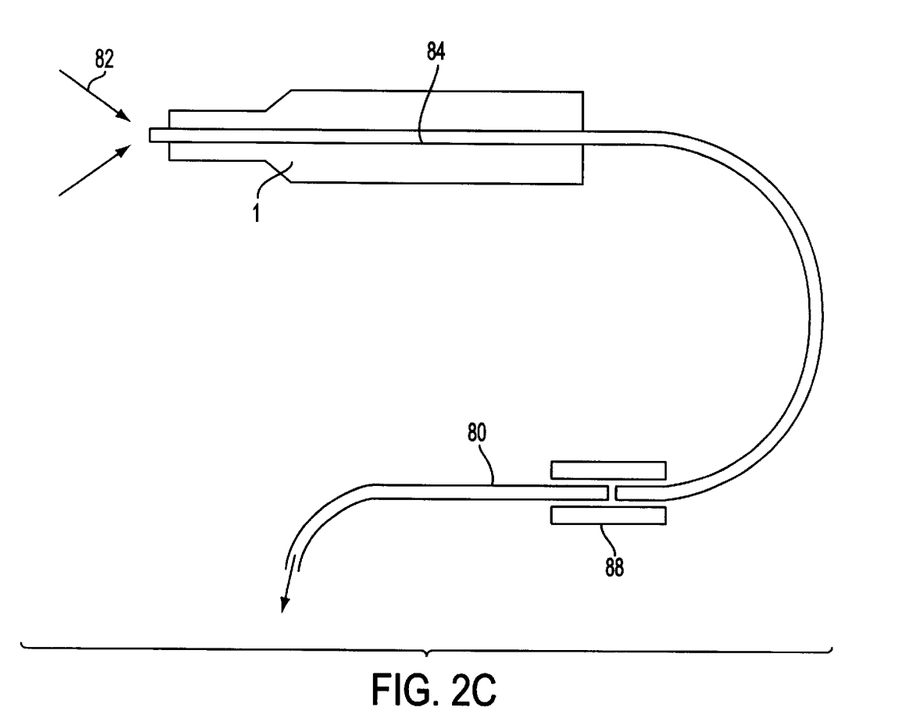

FIGS. 2a–2c illustrate various alternate specific embodiments of the present invention as described above in connection with FIG. 1. FIG. 2a illustrates a first embodiment wherein the spatial filter-to-low melting temperature fiber connection is within a proximal connector 1, such that the use of a high temperature fiber is not apparent to the user.

Figure 4:
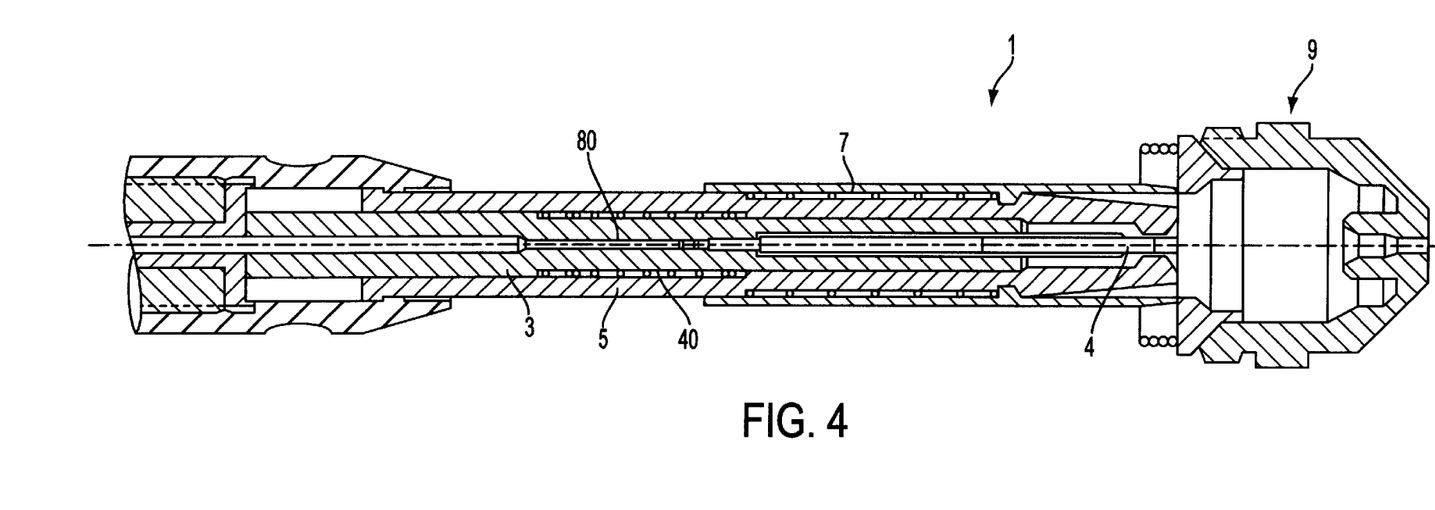
FIG. 4 is a diagram showing one specific embodiment of a proximal connector for use in the present invention.

An example of such a proximal connector is shown in FIG. 4. Connector 1 is made up of a barrel 3, a collet 5, a spring 40 mounted between the barrel and the collet, and a protective sleeve 7 which protects the input end 4 of the optical fiber 84 when not connected to bushing 9. Heat sink 66 is in the form of a fiber support tube. Further details of the connector 1 are described in U.S. Pat. No. 5,452,392 and will not be repeated herein.

FIG. 2b illustrates a second embodiment wherein the low temperature fiber 80 is attached to a separate connector 86 which can be plugged into connector 1. In this embodiment, the proximal connector 1 is reusable, while the low temperature fiber 80 is disposable.

FIG. 2c shows a third possible embodiment in which high temperature fiber 84 extends outside of proximal connector 1 and is coupled to low temperature fiber 80 through an external connector 88.

In all three embodiments, the fiber-to-fiber connection requires a spaced apart configuration and heat sinking at the connection when the low melting temperature fiber is composed of plastic. For higher temperature fibers such as borosilicate, the spacing is less critical.

Figure 5:
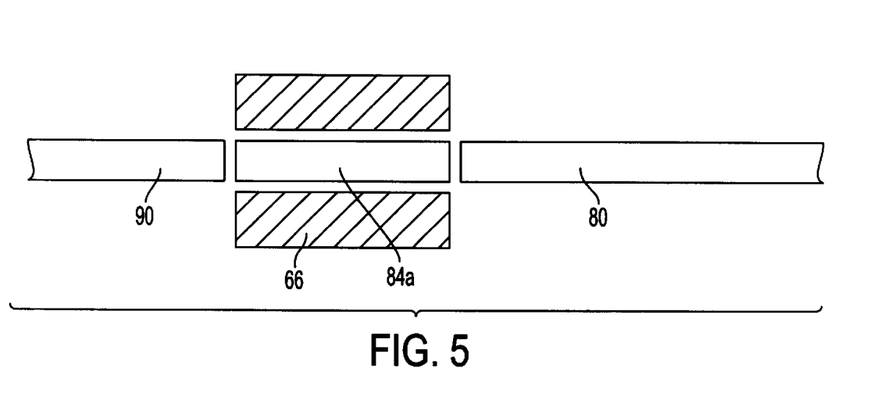
FIG. 5 shows an alternate embodiment of the present invention wherein the spatial filter is used to couple light from a high NA optical fiber to a low temperature, low NA optical fiber.

FIG. 5 shows another alternate embodiment of the invention which increases the amount of light able to be transmitted through a plastic fiber without damage. Whereas a high NA quartz fiber is able to couple substantially more light from an arc source than a lower NA fiber, the resultant spatial filtering is less than optimal if the NA of the receiving low melting temperature fiber is less than that of the quartz fiber. This situation can be remedied either by matching the NA of the spatial filtering fiber to be less than or equal to the NA of the light receiving plastic fiber, or by incorporating a second fiber of NA equal to or less than that of the plastic fiber as a spatial filter between the high NA quartz fiber and the receiving plastic fiber. This configuration enables at least 50% more light to be coupled into a plastic receiving fiber than direct coupling without such a spatial filter.

In practice, there is a limit to which filtering will successfully eliminate melting of the plastic fiber because of absorption by color centers within the plastic fiber. Ultimately, the upper bound is determined by the absorptivity of the low melting temperature fiber, its purity, and the presence of contaminants at the interface between fibers. Maximizing the intensity of transmitted light to a plastic fiber is dependent on the power density of light emitted by the spatial filter, the characteristics of the mechanical heat sink, and the amount of spacing between fibers. Generally, when power density exceeds 400 mW/mm² a spaced apart configuration is required and the connector must be able to function as a heat sink.

In FIG. 5, the spatial filtering fiber 84a of low NA is used to couple light from a high temperature, high NA optical fiber 90 into a low temperature, low NA optical fiber 80. The optimum relationship of the NAs of the system is $NA_{fiber\ 90} > NA_{fiber\ 84a} \leq NA_{fiber\ 80}$. The high NA light energy outputted by fiber 90 will not be propagated by the low NA spatial filter but will be dissipated within its length. Heat generated by such dissipation will be conducted away from fiber 84a by heat sink 66. Only low NA guided modes will be outputted by fiber 84a and coupled into low temperature fiber 80. As such, low temperature operation of fiber 80 can be maintained. As compared with the prior art, the amount of light able to be coupled to a low melting temperature plastic fiber is 3 to 5 greater.

In the preferred embodiments of the present invention, the optical fibers are single core fibers of diameter from 0.1 mm to 1.0 mm. However, the principles of the invention may be applied equally to optical fiber bundles.

A further preferred embodiment of the invention will be now described with reference to FIGS. 6A and 6B. According to this preferred embodiment, a spatial filter 84b is formed of a bundle of single fiber optics, fused together. Like numerals in FIGS. 6A and 6B denote like elements previously described.

Figure 6A:
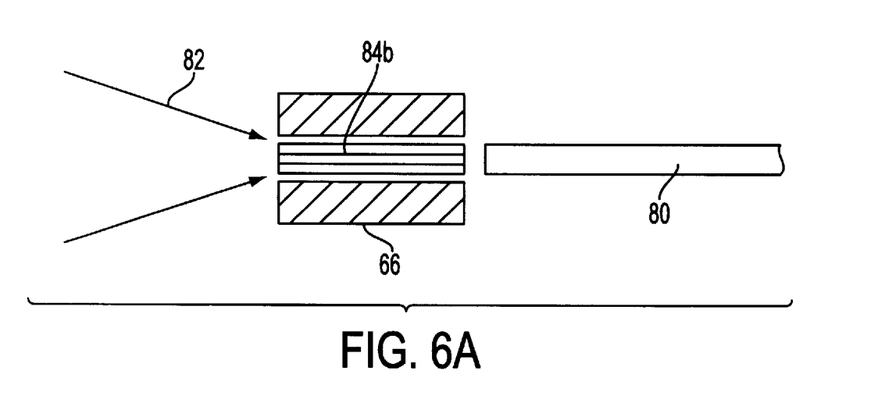
FIG. 6A is a diagram of an additional preferred embodiment of the invention, wherein the spatial filter is formed of a fused fiber optic bundle.
Figure 6B:
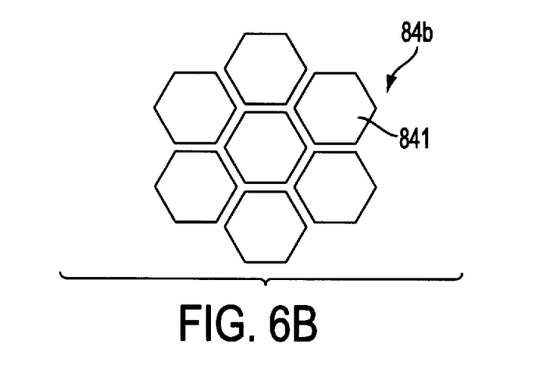
FIG. 6B is a cross-sectional view of the fused fiber optic bundle 84b of FIG. 6A.

Use of a fused fiber optic bundle as a spatial filter, such as illustrated in FIG. 6A as one example, allows greater control and precision in the coupling of higher intensity light into receiving single fiber optics or fiber optic bundles, permitting the shaping of the output intensity profile to a desired spatial intensity profile.

While the use of a single fiber as a spatial filter removes unguided modes of light, which are not able to be transmitted by the receiving optical fiber, such a single fiber spatial filter scrambles the incident image profile and produces a characteristic intensity profile and angular distribution of light in the near field of the exit plane of the single fiber. Provided that the length of the single fiber is approximately greater than 30 times its diameter, the light at the exit plane in the near field (the area very near the output end of the fiber, for example approximately 0–0.2 mm from the output end of a 1.0 mm diameter fiber) will be characterized by a flat intensity profile and the same angular distribution at each point (as determined by the numerical aperture (NA) of the fiber optic). In the far field, the exiting light will have a Gaussian intensity profile and will have an angular distribution determined by the NA of the fiber optic. If there is no gap between the spatial filter and the receiving fiber, the light entering the receiving fiber will be characterized by the near field profile. As the gap between spatial filter and receiving fiber increases, the intensity profile of the light entering the receiving fiber crosses over from near field to far field.

A fused bundle is composed of fiber optics typically less than 100 microns in diameter. According to the invention, fused bundle 84b is composed of fibers 841 having a fiber "diameter" (or pixel size) of 20 microns to 60 microns, as shown in FIG. 6B. The individual fiber pixels are typically hexagonal in shape to facilitate maximum packing density and minimum transmission losses. The fused bundle spatially filters unguided modes of light within a length approximately equal to 10 times the pixel diameter. As a result, the length required of a spatial filter composed of a fused fiber optic bundle for diffusion of unguided modes of light is considerably shorter than the length required for a single fiber spatial filter of the same overall diameter as that of the fused bundle.

Figure 7A:
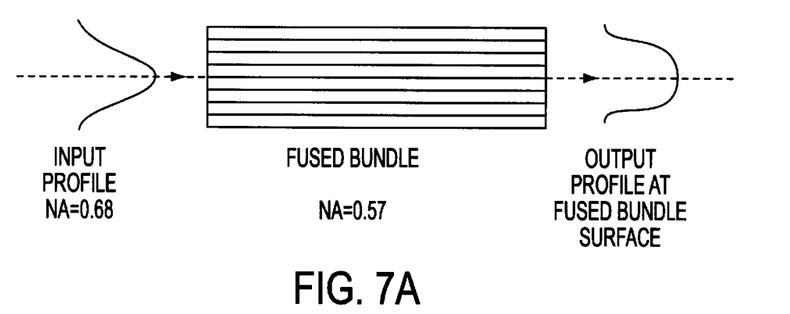
FIG. 7A is a diagram illustrating the spatial filtering effect of a fused fiber optic bundle.
Figure 7B:
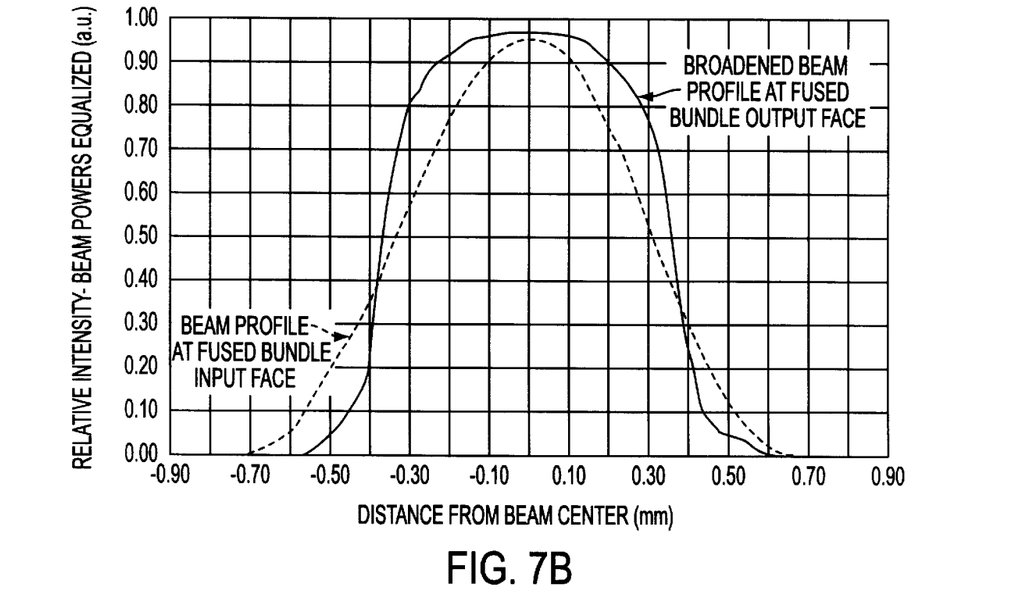
FIG. 7B is a graph illustrating differences in intensity profiles at the input and output faces of a fused bundle.

Unlike a single fiber spatial filter, in which the energy from unguided modes of light diffuses out of the fiber and guided modes are contained within the multimode structure of the fiber itself, light transmitted through a fused bundle is subject to "cross talk" or cross coupling of light among fibers because of the thin cladding between the individual fibers which are fused together. As a result, the near field image at the exit plane of the fused bundle spatial filter is different from the near field image of a single fiber spatial filter. The image at the input face of a single fiber spatial filter is scrambled at the output face; in contrast, the image at the input face of a fused bundle spatial filter is transmitted to the output face largely unchanged, if the NA of the incident light is less than or equal to the NA of the fused bundle. If the NA of incident light is equal to or greater than that of the fused bundle, the cross coupling phenomenon causes light incident on each pixel of the bundle at the input face to be spread spatially, as shown in FIG. 7A, depending on the NA of the incident light and the NA of the fused bundle material, thereby modifying the intensity profile of the images. FIG. 7B is a graph comparing values of beam intensity profile between the input face and the output face of the fused bundle.

This "intensity spreading" effect is most pronounced when the length of the fused bundle spatial filter is less than 10 times its diameter. For longer fused bundles, spatial filtering will filter out high NA light, but will retain the intensity profile of the image of the incident light at the input face of the fused bundle. Unlike a single fiber spatial filter where the near field image is uniform (scrambled) and the far field image has a Gaussian profile, the image profile of incident light is preserved at the output of the fused bundle spatial filter in both the near field and far field. If the NA of the input light is greater than that of the fused bundle, light is lost as a result of unguided modes diffusing or "leaking" out through the cladding over the length of the fused bundle. If the NA of the incident light is the same as the NA of the fused bundle, then the spatial filter can be used to transmit highly concentrated light away from the point of focus with the output intensity similar to that at the input.

For example, by using a fused bundle spatial filter with a high intensity light source such as a xenon arc lamp in an off-axis configuration, such as described in U.S. Pat. Nos. 4,757,431, 5,414,600 and 5,430,634, or other concentrating geometry, such as described in U.S. Pat. No. 5,509,095, the fused bundle spatial filter can be used to transmit the image away from the point of focus, which is typically the point of highest concentrated light. By selecting the length, diameter and the NA of the fused bundle to maximize light intensity transmitted and matched to the input characteristics of a receiving single fiber, fiber bundle or other target, an illumination system can be created to preserve the overall intensity profile of the light source minus light that is not able to be transmitted by the receiving target and which would otherwise be converted into heat. This enables much lower melting temperature materials to be used with high intensity light sources, with greatly diminished risk of heat damage.

For a short fused bundle with an outer diameter of less than 30 times the diameter of an individual pixel, the intensity profile is spread by the cross coupling of the fused fibers, resulting in a change in spatial distribution and an increase in the relative amount of light off-axis as compared to on-axis. In other words, the relative intensity of light in the center of the fused bundle at the exit plane decreases as compared to light near the edge of the bundle. The extent to which the light output is spread is a function of the NA of the incident light and is maximized if the NA of the incident light is greater than or equal to the NA of the fused bundle. For longer fused bundles, light of high angle greater than that guided by the fused bundle is lost and the overall intensity is reduced proportionately.

It is thus seen that the use of a fused bundle as a spatial filter enables transmission of light away from a point of high intensity without scrambling the incident image profile and thereby solves the problems of area mismatch, angle mismatch, and heat management between a source of high intensity light and an intensity and angle dependent target such as a fiber optic.

When combined with a system for collecting and imaging or near-imaging high intensity light such as the aforementioned off-axis configuration, a fused bundle spatial filter can be selected with the appropriate combination of diameter and NA to match the target or receiving fiber optic. For example, an arc lamp having a 1 mm arc configured with an off-axis toroid configured to produce an approximate 1:1 image will produce a 1 mm image with approximately 75% of the total intensity taking into account any optical aberrations and astigmatism. A 0.8 mm diameter fused bundle composed of borosilicate or other soft glass and with a NA of at least 0.55 (preferably 0.57) placed at the image is optimized to transmit the maximum light from the image point to a polymer clad quartz fiber of 0.55 NA. The fused bundle thereby spatially filters the higher NA, unguided modes of light from the source, and maximizes the brightness at the output plane of the fused bundle, thus enabling efficient coupling to the polymer fiber without damaging the cladding material. Alternatively, a 1.5 mm diameter fused bundle with NA=0.57 can be used to transmit light from the source to a receiving bundle of densely packed 0.5 mm diameter polymer fibers, although the intensity of light from each fiber will not be the same unless the arc gap of the source is larger than 1.5 mm. By selecting combinations of arc gap size from xenon, mercury, metal halide, and similar arc lamps, and diameter of fused bundles as spatial filters, the output intensity can be made to be more or less uniform depending on the size of the arc and the diameter of the fused bundle. This relationship also is dependent upon whether the optical collecting and condensing system is close to a 1:1 imaging system or in a magnifying or demagnifying configuration.

Figure 8:
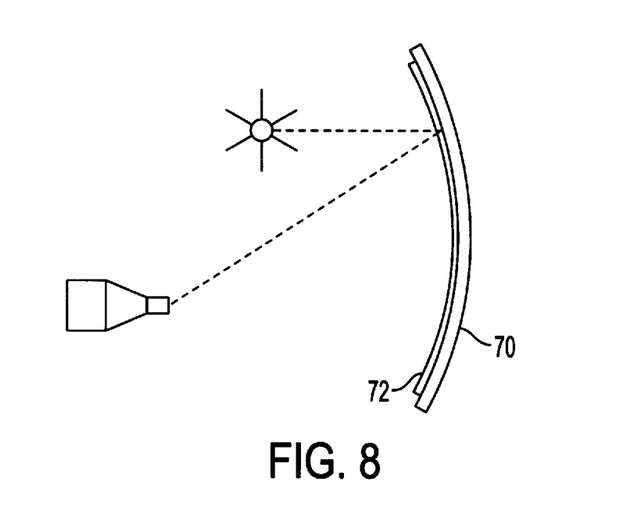
FIG. 8 illustrates the use of a dielectric coating on the reflector of an optical system as a UV absorbing material to filter out undesired wavelengths of light.

Because fused bundles are typically made from soft glass such as borosilicate, they absorb significant amounts of light below 400 nm and above 700 nm. To prevent damage to the fused bundle, input light must be filtered to remove these wavelengths. This is accomplished according to the present invention with dielectric coatings applied to reflectors or lenses of the optical system for launching light into the fused bundle, or by applying a dielectric coating directly to the input face of the fused bundle. One example is shown in FIG. 8 in which a dielectric coating 72 is applied to a reflector 70.

The invention according to this alternate embodiment thus can be used to couple visible wavelengths of light to fiber optic targets made of various materials from quartz to soft glass to plastic such as PMMA or polycarbonate. Although each material has a different maximum light transmission level above which material degradation and/or damage will occur, use of a fused bundle spatial filter permits maximum light transmission by spreading the intensity profile from the center toward the outside dimension of the fused bundle, i.e., from on-axis to off-axis, thereby reducing the peak intensity typically found at the center. Appropriate selection of the spatial filter parameters in accordance with the target material will improve performance, minimize degradation, and extend the useful lifetime of the fiber target. For such optimization a figure of merit of 1 hour operation with no material or light degradation is a reliable indicator for long term satisfactory performance. For example, we have observed that if a PMMA fiber survives 1 hour of high intensity light transmission (e.g. $\geq 1$ watt) without damage, it will survive at least 70 hours of continuous transmission, or indefinitely with cycled transmission times of 8 hours or less.

The invention having been thus described, it will be apparent to those skilled in the art that the same may be varied and modified in many ways without departing from the spirit and scope of the invention. Any and all such modifications are intended to be included within the scope of the following claims.

What is claimed is:

1. Apparatus for coupling high intensity light, having an intensity distribution defined by an image profile, into a receiving target, comprising:

a spatial filter having an input end which receives said high intensity light, unguided modes of said intensity light being dissipated within the length of said spatial filter, wherein an image profile of maximum light intensity incident on said input end being transmitted at an output end of said spatial filter with a broadened spatial intensity profile;

means for filtering wavelengths below approximately 400 nm and above approximately 700 nm from said high intensity light before being transmitted through said spatial filter;

a heat sink in proximity to said spatial filter absorbing heat generated by said spatial filter and conducting said heat away from said spatial filter; and a receiving optical fiber target for receiving at an input thereof substantially only guided modes of light from said spatial filter, and outputting said guided modes of light at an output end thereof.

2. Apparatus according to claim 1, wherein the numerical aperture (NA) of said spatial filter is at least equal to the highest angle of light incident on said input end of said spatial filter.

3. Apparatus according to claim 1, wherein the numerical aperture (NA) of said spatial filter is at least equal to the NA of said receiving fiber.

4. Apparatus according to claim 1, wherein said receiving fiber target is a single fiber optic made of a material selected from the group consisting of plastic, polymethylmethacrylate, polycarbonate, soft glass, borosilicate, and quartz.

5. Apparatus according to claim 1, wherein said receiving fiber target is a plurality of fiber optics made of a material selected from the group consisting of plastic, polymethylmethacrylate, polycarbonate, soft glass, borosilicate, and quartz.

6. Apparatus according to claim 1, wherein the outer diameter of said spatial filter is matched to the outer diameter of said receiving fiber target.

7. Apparatus according to claim 1, wherein said spatial filter comprises a fused fiber optic bundle.

8. Apparatus according to claim 7, wherein said fused fiber optic bundle is composed of a plurality of single fibers, each single fiber having a diameter of less than 100 microns.

9. Apparatus according to claim 7, said fused fiber optic bundle is composed of a plurality of single fibers, and said spatial filter has a length at least thirty times the diameter of said single fibers.

10. Apparatus according to claim 1, wherein said spatial filter receives said high intensity light from a high intensity source of noncoherent light.

11. Apparatus according to claim 10, wherein said high intensity source is an arc lamp having an arc gap.

12. Apparatus according to claim 11, wherein said arc lamp is selected from xenon, mercury, mercury-xenon, and metal halide arc lamps.

13. Apparatus according to claim 11, wherein said spatial filter comprises a fused fiber optic bundle, and the arc gap of said arc lamp is at least equal in length to the largest cross-sectional dimension of said fused bundle.

14. A method for coupling high intensity light, having an intensity distribution defined by an image profile, into a receiving target, comprising the steps of:
- receiving incident high intensity light in a spatial filter, dissipating unguided modes of said received intensity light, wherein an image profile of maximum incident light intensity is transmitted with a broadened spatial intensity profile;
- filtering wavelengths below approximately 400 nm and above approximately 700 nm from said high intensity light before being transmitted;
- providing a heat sink in proximity to said spatial filter for absorbing heat generated by said spatial filter and conducting said heat away from said spatial filter; and
- providing a receiving optical fiber target for receiving at an input thereof substantially only guided modes of light from said spatial filter, and outputting said guided modes of light at an output end thereof.

* * * * *